Jan. 21, 1958
E. O. SHREFFLER
2,820,284
SPRING SPREADING TOOL
Filed Sept. 22, 1954
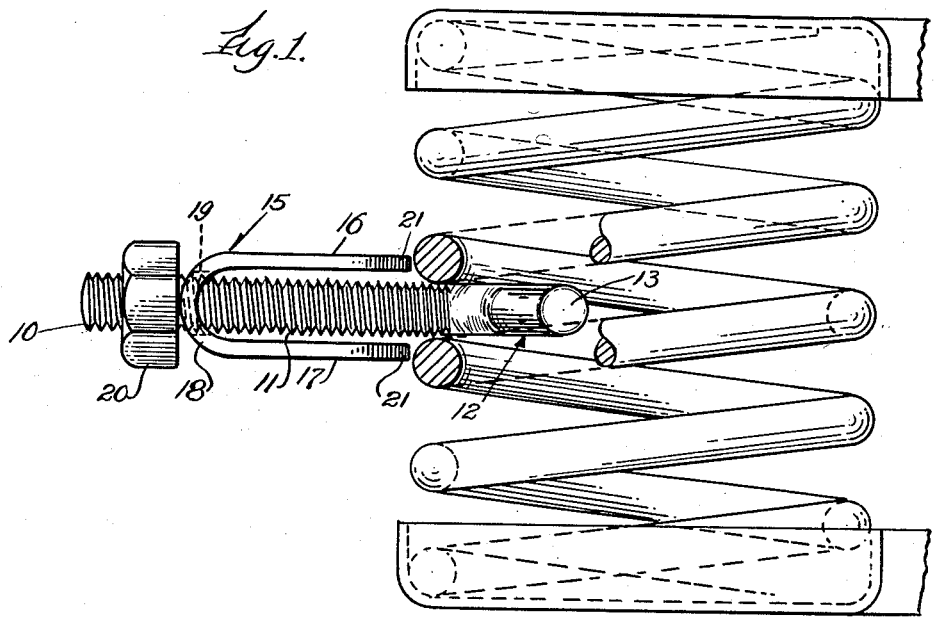
Fig.1.
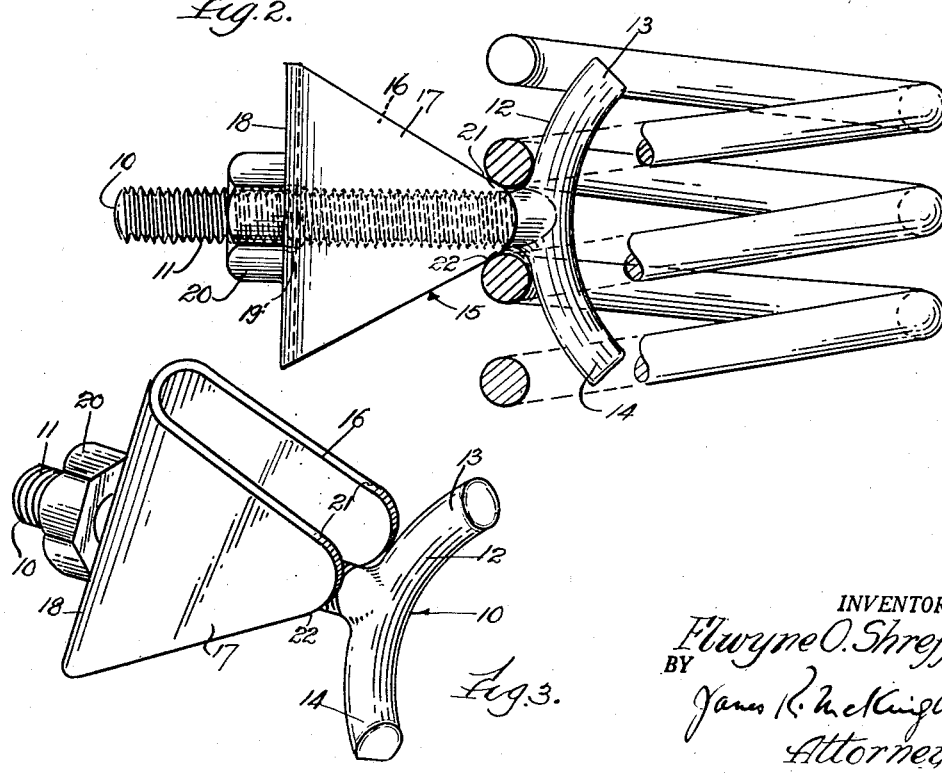
Fig.2.
Fig.3.
INVENTOR.
Elwyne O. Shreffler.
BY
James R. McKnight
Attorney.

United States Patent Office 2,820,284
Patented Jan. 21, 1958

2,820,284

SPRING SPREADING TOOL

Elwyne O. Shreffler, Manteno, Ill.

Application September 22, 1954, Serial No. 457,645

3 Claims. (Cl. 29—227)

My invention relates to a tool for expanding the coils of a coil spring and permitting the insertion of one or more stabilizers between the coils of a coil spring.

After long use coil springs tend to weaken. In an automobile such weakened coil springs lower the front end of the car so that the wheels are out of alignment causing hard steering, excessive tire wear, and dangerous operating conditions. Coil springs in such condition may be corrected by the insertion of one or more stabilizers or boosters between the coils. Such devices are illustrated in Patent 2,230,340 of February 4, 1941, on Adjusting Means for Knee Action Mechanisms, and in my co-pending application for patent on Adjustable Member for Coil Springs No. 434,397, filed June 4, 1954.

Heretofore a pair of flat bars or crow bars were used to spread the coils of the spring apart so that the stabilizer could be inserted between the coils. These tools were heavy, awkward, expensive, cumbersome to use and inefficient and slow in operation.

It is among the objects of this invention to solve these problems and provide a tool adapted to spread coils apart easily, rapidly and efficiently for the insertion of the stabilizers. My tool is inexpensive, light, requires little effort to use and may be operated by any one with little training or skill. My tool is rapid and efficient in operation. It is so constituted that a stabilizer may be inserted on either side of the tool so that more than one stabilizer may be inserted in a single operation. This was not possible with the use of the old flat or crow bars.

My invention also contemplates such other objects, advantages and capabilities which are inherently possessed by my invention and which will later more fully appear.

While I have shown in the accompanying drawing a preferred form of my invention, yet I wish it understood that the same is susceptible of modification and change without departing from the spirit of my invention.

Referring to the drawings, Fig. 1 is an edge view of my tool being inserted between the coils of a spring; Fig. 2 is a face view of the same turned 90° for spreading the spring coils apart; and Fig. 3 is a perspective view of my tool.

The embodiment selected to illustrate my invention comprises a T bar 10 having a screw threaded shank 11 with an integral head portion 12 formed by a pair of outwardly and upwardly curved arms 13 and 14. A cam 15 having a pair of triangular shaped lip portions 16 and 17 connected by integral rear portion 18 with opening 19 therethrough is movably mounted on shank 11. A screw threaded nut 20 engages shank 11 below cam 15.

When it is desired to use my tool to insert a stabilizer between the coils of a coiled spring, the user inserts head 12 in flat position between the coils. The cam 15 is also in flat position and is held on the lower part of shank 11 by nut 20. When the head has been inserted back of the coils, my tool is turned one quarter turn, so that the head 12 and cam 15 are in upright position. A socket wrench or other suitable tool is applied to nut 20 and turned. As the nut 20 moves upwardly on the shank 11, it moves against rear portion 18 of cam 15 and pushes the cam upwardly on the shank. The cam surfaces 21 and 22 engage the upper and lower coils of the coiled spring and spread them apart. When the cam has been moved upwardly so that its cam surfaces have spread the coils to provide sufficient space therebetween for the entry of a stabilizer, a stabilizer is inserted between the coils on either side or both sides of the cam.

Then, nut 20 is moved downwardly by a socket wrench or other suitable means permitting cam 15 to move downwardly out of contact with the coils. A quarter turn is then given my tool, returning the cam and head to flat position and permitting their removal from between the coils.

Having thus described my invention, I claim:

1. A tool for expanding the coils of a coil spring comprising a head, a shank connected to and extending below said head, a cam having a pair of flat triangular portions and a connecting portion spacing said triangular portions, said cam movably mounted on said shank, and a retaining member mounted on said shank below said cam and movable against said cam for moving said cam against the coils of a coiled spring for spreading them to permit the insertion of a stabilizer between the coils.

2. A tool for expanding the coils of a coil spring comprising an insertion bar having a curved T shaped head and an integral depending shank, a retaining member mounted on said shank, a cam having a pair of flat triangular portions and a connecting portion spacing said triangular portions, said cam mounted on said shank between said head and said retaining member, said retaining member movable on said shank against said cam for moving said cam against the coils of a coiled spring for spreading them to permit the insertion of a stabilizer between the coils.

3. A tool for inserting between and expanding the coils of a coiled spring comprising a T shaped bar having a screw threaded shank and an integral head, a cam having a pair of flat triangular portions and a connecting portion spacing said triangular portions and having a hole therethrough, said cam having on its outer edges a pair of spaced lip portions, said cam movably mounted on said shank with the shank extending through the hole in said cam, a nut screw threaded on said shank below said cam, said head adapted when in line with the flat triangular portions of said cam to be moved between and beyond the coils of a coil spring, said cam then upon the tool being turned a quarter turn to the right adapted to engage upper and lower coils of the coil spring with its lip portions, and upon being moved forwardly by the turning of said nut to move said coils away from each other so that a spring stabilizer may be inserted between the coils on each side of said cam.

References Cited in the file of this patent
UNITED STATES PATENTS

| | | |
|---|---|---|
| 1,009,875 | Whitelaw | Nov. 28, 1911 |
| 1,311,128 | Kilgour | July 22, 1919 |
| 1,469,076 | Faber | Sept. 25, 1923 |
| 1,632,720 | Worster | June 14, 1927 |